United States Patent [19]
Davis, Jr.

[11] 3,907,357
[45] Sept. 23, 1975

[54] VAN STEP WELL CONSTRUCTION

[76] Inventor: William F. Davis, Jr., 193 North St., Rittman, Ohio 44270

[22] Filed: July 5, 1973

[21] Appl. No.: 376,272

[52] U.S. Cl............ 296/146; 296/28 A; 280/164 R
[51] Int. Cl................................................ B60r 3/00
[58] Field of Search......... 280/163, 164 R; 296/146, 296/28 A, 28 AB; 240/7.3

[56] References Cited
UNITED STATES PATENTS

| | | | |
|---|---|---|---|
| 1,072,096 | 9/1913 | Dean.................... | 240/7.3 |
| 1,612,839 | 1/1927 | Shields................. | 296/146 |
| 1,707,311 | 4/1929 | Masury................. | 296/28 A |
| 2,255,880 | 9/1941 | Gregorie............... | 280/163 X |
| 3,659,893 | 5/1972 | Steele.................. | 296/23 R |

Primary Examiner—Robert B. Reeves
Assistant Examiner—Joseph J. Rolla
Attorney, Agent, or Firm—Oldham & Oldham Co.

[57] ABSTRACT

A van-type vehicle having a roof with a downwardly extending side edge, a door in the side of the vehicle body, a step well means positioned behind the door which extends below the rocker panel of the vehicle, the vehicle roof including an opening formed in the lower portion of its side edge which forms a continuation of the body door opening to provide increased height therefor, the door having an upper section thereon filling the roof opening when the door is closed, the roof opening including roof rail continuation means positioned at the margins of the roof opening to reinforce the same.

3 Claims, 5 Drawing Figures

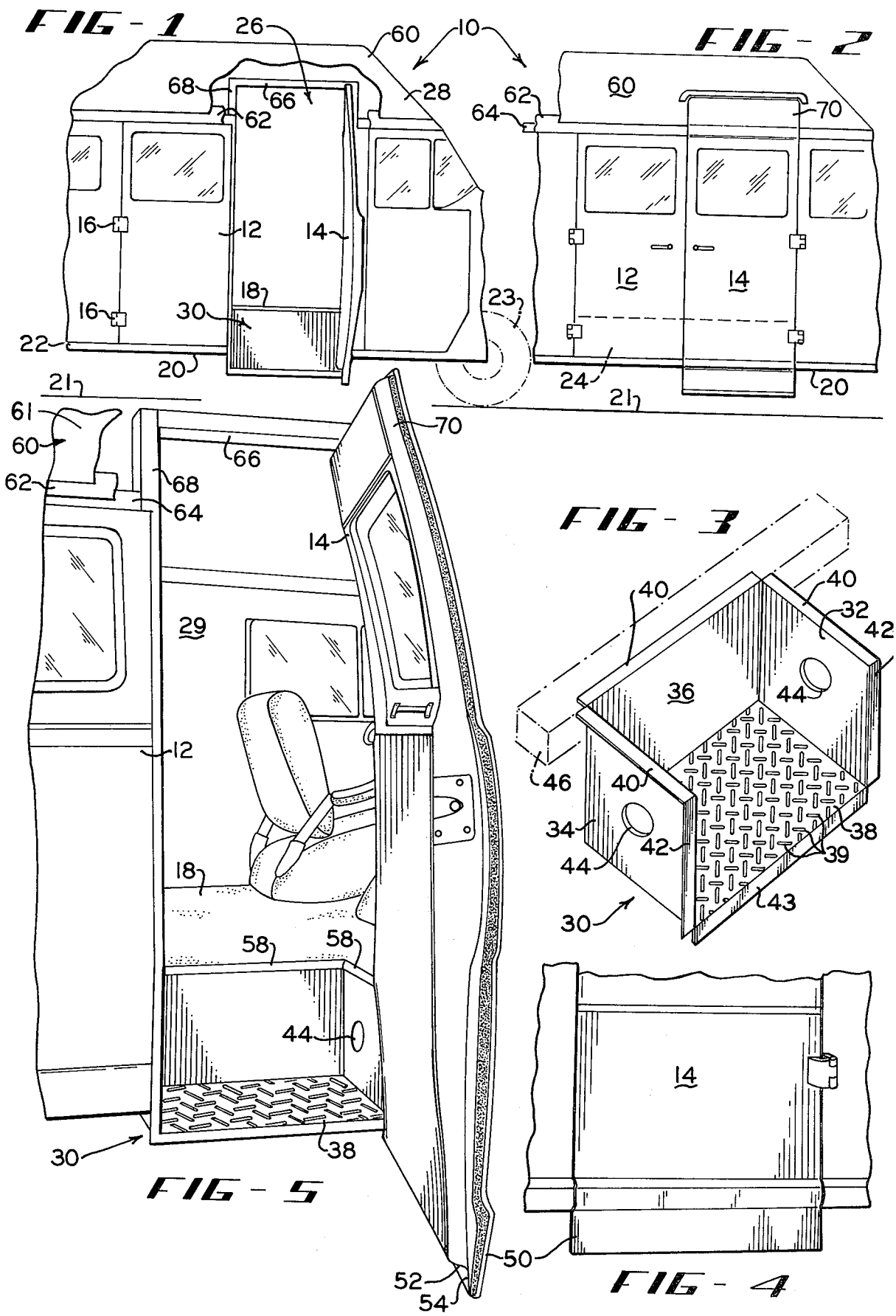

VAN STEP WELL CONSTRUCTION

Heretofore it has been well known by those whose frequently use motor vans or "mini-buses" that access through the side doors to the interiors thereof is a difficult feat. Most generally, it is an uncomfortably high step from the ground or roadway to the floorboard of the van. Such a high step is difficult to negotiate by physically adept adults and quite impossible for the elderly or young children.

It is presently known in the art that a movable step may be positioned beneath the body of the van and be linked to one of the side doors thereof so that the opening of the side door moves the step from beneath the van to a position below and immediately adjacent the opening created by the door. Such temporary-type step mechanisms have been found to be undesirable for several reasons. First, the linkage interconnecting the door and the temporary step must, most generally, be fully extended so as to lock the temporary step into its proper position. If the linkage is not so extended, the weight of one upon the step may cause the same to rapidly move back toward its stored position thus causing injury to the user. Second, such steps are stored in an environment open to the elements, often times becoming muddy, dirty, or snow packed as a result of the ambient environmental conditions. Third, such temporary-type steps require moving mechanical apparatus to achieve the proper positioning thereof, such apparatus being subject to wear and malfunctioning.

Consequently, it is an object of the instant invention to present a van step well which is at a convenient elevation above the ground and which is stationary and consequently not movable by the weight of a user.

A further object of the invention is to present such a van step well which is totally enclosed within the van and not subject to the deteriorating effects of the elements.

Yet other objects of the invention are to present a combination of a van step well, a roof opening and a heightened door so that access to the van is facilitated by the presence thereof; and to reenforce the roof at the roof opening.

Still another object of the invention is to present a sturdy, stationary, and inexpensive step well for a van or mini-bus which is easily adaptable to any of numerous vans presently available.

These objects and other objects which will become apparent as the detailed description proceeds are achieved by the improvement in a van-type vehicle of a step well and altered door, comprising a back panel; two side panels, one side panel being fixedly connected to each end of the back panel; a bottom panel comprising a step fixedly connected to the bottom edge of each of the side panels and the back panel, the bottom being positioned below the bottom of the rocker panel of the van in parallel relationship thereto; means for connecting the back panel and side panels to the base and vertical frame structures of the van; and a door extension panel connected to the bottom edge of the door and depending therefrom to a point at least level with the bottom panel. The door also may have an upper extension thereon cooperating with an elevated section of the roof rail to provide a door of increased heighth.

For a clear understanding of the techniques and structure of the invention reference should be had to the detailed description and accompanying drawing wherein:

FIG. 1 is an elevation of a van-type vehicle having one side door open and with frame means for the vehicle being indicated;

FIG. 2 is an elevation of the vehicle with the side door closed;

FIG. 3 is a perspective view, partly diagrammatic, of the installed step well structure;

FIG. 4 is a perspective view of the lower part of the side door and the step well; and FIG. 5 is a perspective view of the door of the van and the step well of FIG. 3 installed in a van.

Referring now to the drawings, it can be seen that a typical van-type vehicle is designated generally by the numeral 10. The van 10 is of the general type having two side doors 12, 14 attached to the body thereof by means of exterior hinges 16. The side doors 12, 14 open outwardly and expose the compartment 26 behind the front seat, the compartment 26 being defined by the roof 28, side panels 29, and floor 18. However, the door 12 may be permanently retained closed if desired.

As is well known to those skilled in the art, the bottom 20 of the van body 10 is displaced from the floor 18 by a distance required for the passing of the transmission, exhaust system, and other such systems from the front end of the van to the rear thereof. The spacing between the floor 18 and the bottom 20 is covered by a rocker panel, or side lower edge strip 22 and a door sill 24. The spacing between the floor 18 and the bottom 20 and the spacing between the bottom 20 and the road or ground surface 21 supporting the van wheels 23 dictates that the distance between the floor 18 and the ground surface constitutes an abnormally high step.

To alleviate the high step just described, the invention teaches that a portion of the rocker panel 22, door sill 24, and floor 18 be cut from the van body 10 at a point immediately adjacent one of the side doors 12, 14 and a step well 30 be fixedly inserted into the cutout portion. As can best be seen in FIG. 3, the step well 30 comprises sides 32, 34, a back 36, and a bottom portion or step 38. The step 38 preferably has a plurality of ribs 39 formed therein to insure good frictional contact with one's foot. The ribbed step 38 may further be covered with a coating of rubberized material to increase the frictional characteristics thereof. The sides 32, 34 and the back 36 preferably have horizontal flanges 40 formed at the top edges thereof while the sides 32, 34 and the step 38 preferably have vertical flanges 42 formed at the side edges thereof. It should be readily apparent to one skilled in the art that the entire step well 30 might readily be formed from a single piece of sheet metal properly cut and folded so as to form the sides 32, 34, back 36, step 38 and flanges 40, 42. Or the sides 32, 34 and the back 36 can be one piece to which the step 38 is suitably secured. Or the sides 32, 34 would be welded or otherwise fixedly attached to the back 36 and to the step 38 so as to complete a sturdy uni-construction step well 30.

As is best shown in FIG. 3, the floor 18 of the van body 10 will usually be cut out to the point where a beam 46 of the van frame is positioned. The horizontal flange 40 at the top of the back 36 is then tack welded or otherwise fixedly attached to the beam 46. Of course, the dimensions of the step well 30 must be made to conform to the positional relationship of the beam 46 with the door opening. If the van is of a unibody construction then the flange 40 at the top of the back 36 will merely be welded or otherwise attached to the sheet metal panel of the floor 18. In any such case, the horizontal flanges 40 atop the sides 32, 34 will be fixedly attached to the sheet metal floor panel.

Along the hinged side of the side doors 12, 14 there is generally present a pillar post (not shown) which forms a part of the van framework. One of the vertical flanges 42 attached to the sides 32, 34 is preferably connected by welding or other means to such a pillar post. The other vertical flange 42 extending from the other side of the step well 30 is then affixed to the door sill 24 and rocker panel 22 behind the door 12. The step well 30 is thus strongly secured to the body of the van 10. Moldings 58 may be provided to cover the flanges and joints created thereat so as to give a pleasing appearance and provide a smooth connection between the step well 30 and the floor 18.

It should here be noted that a unique provision has been made with the step well 30 of the instant invention in that provisions have been made in the sides 32, 34 for the insertion of lights 44. Of course the lights 44 will have a protective lens thereover to protect the light bulbs from damage. The light bulbs themselves would preferably be the low voltage, low wattage bulbs normally used for backup lights or the like. Preferably, the lights 44 would be actuated by the opening of the door 14 which makes the step well 30 accessible. Such actuation would be similar in nature to the commonly known dome light which is actuated by a push switch on the door frame. The provision of the lights 44 allows the user to ascertain the safety of the step which he is about to take and hence is a most desirable provision.

As can best be seen in FIGS. 4 and 5, alterations must be made to the door 14 immediately adjacent the step well 30. The step well 30 will depend from the bottom 20 of the van 10 a distance dependent upon the height of the bottom 20 above the ground level 21. Of course, many State Highway Regulations dictate the minimum clearance distance between the road surface and elements depending from the bottom of the vehicle. Considerations must be given to such regulations when designing the step well 30. Nonetheless, the step well 30 will normally extend below the normal bottom level 20 of the van 10. Consequently, a door extension panel 50 must be added to the door 14 which opens into the step well 30. The extension panel 50 will be of generally the same type sheet metal as the outer door skin of the door 14. The extension panel 50, at the bottom thereof, forms a lip 52 which closely overhangs the step 38 when the door 14 is closed. The lip 52 overhangs a recessed inner edge 54 which, when the door is closed, sealingly engages the vertical flange 43 depending from the step 38. Of course, a weather sealing strip or other type sealing material may be adhered to the recessed inner edge 54 and extend upward along the edge of the door 14 so that a weather tight sealing engagement may be made between the door 14 and the flanges 42 and 43 of the step well 30. Hence the step well 30 will be totally shielded from the affects of the elements.

It should of course be noted that the presence of the step well 30 in no manner interferes with the operability of either of the doors 12 or 14. As is common in many van type vehicles, one of the doors 12, 14 makes locking engagement with the top framework of the van and the door sill 24. Normally such locking engagement is achieved by the actuation of locking bars or rods which slip into locking holes provided in the top and bottom framework of the van body. The other door of the side doors 12, 14 is then secured to that door which is locked to the van framework. It should be understood that the step well 30 will be positioned immediately adjacent that door which does not lockingly engage with the van framework so that a removal of portions of the door sill 24 will not interfere with the locking mechanism of the doors 12, 14. In the illustration of the drawing, it should be understood that the door 12 lockingly engages with the framework of the van 10 while the door 14 lockingly engages with the door 12.

The door 14 as initially made may still be somewhat objectionable. Hence for more headroom in the van, the initial roof of the van may be replaced by a roof 60. Such roof may be made of molded plastic or equivalent and be suitably attached to an edge strip 62 extending from a roof rail 64. The edge strip 62 may be a residue of the original van roof. This roof 60 includes a downwardly extending side edge 61.

To add to the invention, the roof rail 64 has a continuation section 66 above the door 14 cut therefrom and secured above remaining portions of the roof rail 64 by connecting support sections 68. This eliminates a portion of the roof above the door 14. Hence an upper extension 70 is suitably secured to the door and it extends above the other door 12 and up into the lower edge of the roof. Now when the door 12 is open, sufficient space is provided for the normal size person to step on the step well 30 and into the van without stooping. Any suitable gasket or sealing strip means is provided around the inner surface of the upper extension 70 to bear on the van for sealed engagement therewith. The extension 70 of course fits smoothly into the adjacent contour of the van.

It should further be noted that the step well of the invention forms an enclosure that depends from the bottom of the van at a point in alignment with the front and rear wheels along one side thereof. Thus, the step well will travel along the same path as the wheels and be easily protected from effects of rough terrain by the maneuvering of the operator.

Thus it can be seen that the objects of the invention have been achieved by the techniques and apparatus presented hereinabove.

While in accordance with the Patent Statutes only the preferred embodiment and best mode of the invention contemplated by the inventor have been presented and described in detail, it is to be understood that the invention is not limited thereto or thereby. For an appreciation of the scope and breadth of the invention reference should therefore be had to the appended claims.

What is claimed is:

1. In a van-type vehicle having a roof with a downwardly extending side edge, a side door, a floor panel, and a rocker panel beneath the side door, a vehicle frame means, and a second side door, the improvement comprising:
   a step well means operatively engaging the vehicle frame means and positioned behind the second side door,
   said second side door extending below the rocker panel of the vehicle,
   means positioning said second side door for opening the same to expose said step well means,
   said vehicle frame means including a roof rail extending along the lower edge of said roof, said vehicle roof including an opening formed in the lower portion of its side edge at a vertically higher portion of the vehicle than the upper edge of said side door but which opening forms a continuation of the door opening for said second side door, said second side door having an upper section thereon filling the roof opening when the door is closed but exposing such opening when the door is opened, said roof opening including a roof rail continuation section positioned at the margins of said roof opening to reinforce the same and said roof rail continuation section being fixedly secured to said roof rail to form a continuous roof reinforcing member.

2. In a van-type vehicle having a body, including a rocker panel, a roof, a floor means, a vehicle frame means, and a door operatively position in a side of said body, the improvement comprising a step well means operatively engaging the vehicle frame and positioned behind said door, said door extending below the rocker panel of the vehicle, means positioning said door for opening the same to expose said step well means, and the vehicle roof having an opening formed therein immediately above and forming an extension of an opening provided in said body for said door, said door having a top section thereon filling said roof opening when the door is closed whereby additional entry space is provided at both the bottom and top of said door when it is opened to expose said step well means and said roof opening;

said vehicle roof having an edge section extending downwardly of the vehicle, said opening being formed only in the lower edge of said edge section; and reenforcing members for said edge section and said roof opening fixedly secured to the vehicle and forming a continuous unit at the margins of said opening and said edge section.

3. In a van-type vehicle as in claim 2, said reinforcing members include a roof rail operatively engaging the edge portions of said roof and a roof rail continuation section positioned at the margins of said roof opening and said roof rail and roof rail continuation section being fixedly secured together to establish a continuous reinforcing member.

* * * * *